United States Patent [19]
Hu

[11] Patent Number: 5,243,503
[45] Date of Patent: Sep. 7, 1993

[54] FOG-LIGHT ASSEMBLY

[76] Inventor: Chiu S. Hu, No. 217, Kae Hsuan Rd., Feng Shan City, Kao Hsiung Hsien, Taiwan

[21] Appl. No.: 944,887

[22] Filed: Sep. 14, 1992

[51] Int. Cl.$^5$ .................................................. B60Q 1/00
[52] U.S. Cl. .................................... 362/82; 362/83.2; 362/386
[58] Field of Search .................... 362/82, 83.2, 386

[56] References Cited
U.S. PATENT DOCUMENTS 2,662,605 12/1953 Riggs ........................................ 362/82
4,058,720 11/1977 Renfrow ................................. 362/82

*Primary Examiner*—Carroll B. Dority
*Attorney, Agent, or Firm*—Stoel Rives Boley Jones and Grey

[57] ABSTRACT

A fog-light assembly having (A) a plate having an upper margin attached to a front bumper of a car and a lower margin formed with a track on the rear side of the plate, (B) a pair of fog lights sliding on and along the track, between a working position where the fog lights are beside the plate and an idle position where the fog lights are hidden behind the plate and (C) a driving bolt for moving the fog lights by threading.

1 Claim, 4 Drawing Sheets

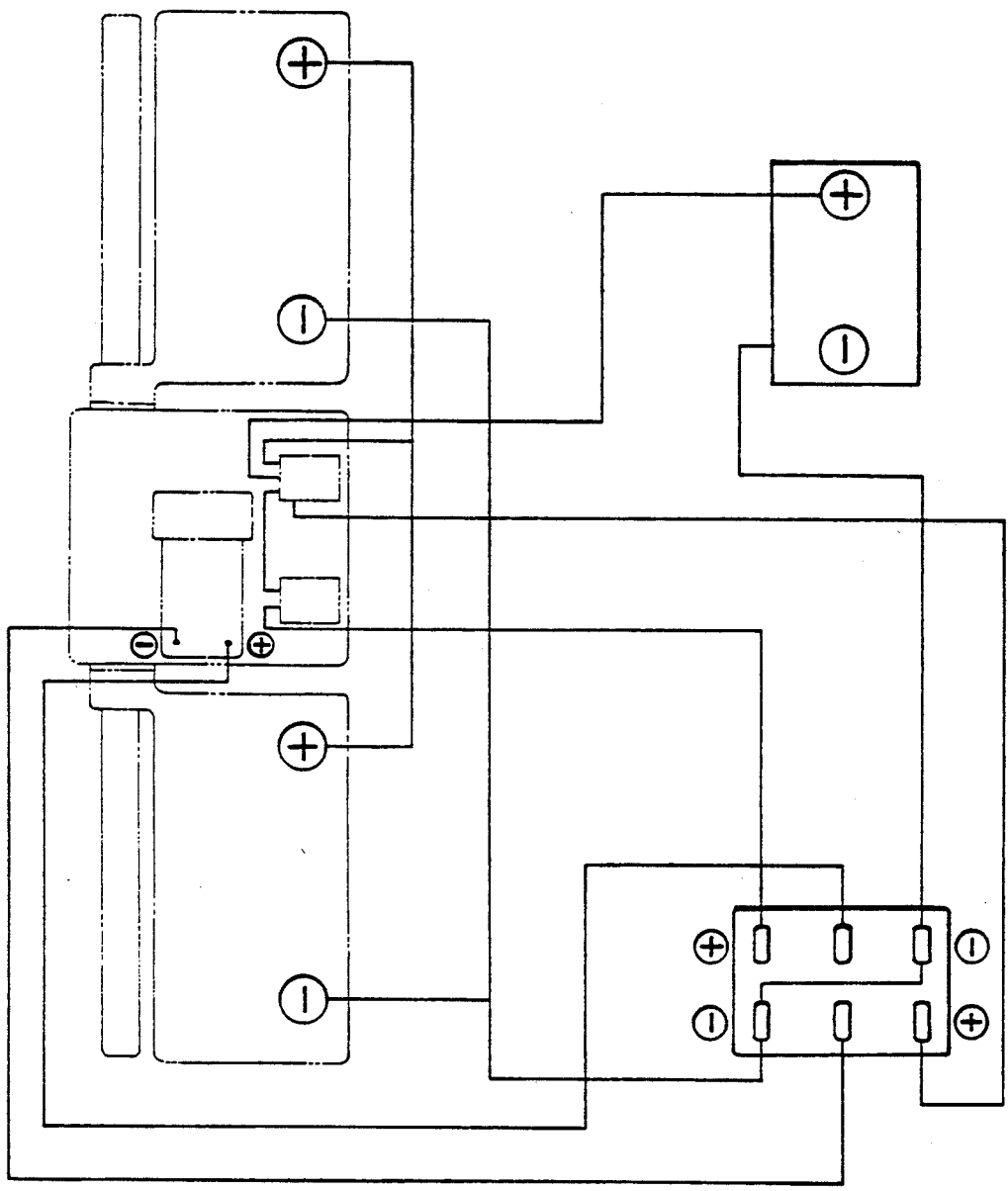

FOG-LIGHT ASSEMBLY

BACKGROUND OF THE INVENTION

The present invention relates to a fog light assembly and, more particularly, to a fog light assembly which has (A) a plate having an upper margin attached to a front bump of a car and a lower margin formed with a track on the rear side of the plate, (B) a pair of fog lights sliding on and along the track, between a working position where the fog lights are beside the plate and an idle position where the fog lights are hidden behind the plate and (C) a driving bolt for moving the fog lights by threading.

Generally, high-end cars are equipped with built-in fog lights. As such fog lights are built in such cars, over-all esthetic prospects were taken into account during the styling of such cars. Low-end cars are not equipped with built-in fog lights. However, fog lights are preferable for safe driving in fog. But, such fog lights look odd on such cars as over-all esthetic prospects were not taken into account during the styling of such cars. Therefore, the present invention is intended to solve the above-mentioned problem.

SUMMARY OF THE INVENTION

It is an object of the present invention to provide a fog-light assembly which is mounted on a front bumper of a car without breaking the integral design of the car.

It is another object of the present invention to provide a fog-light assembly consisting of a pair of fog lights concealed when in an idle position.

It is yet another object to the present invention to provide a fog-light assembly having means for exposing a pair of fog lights beside a plate when in a working position and for hiding the pair of fog lights behind the plate when in an idle position.

It is still another object of the present invention to provide a fog-light assembly having means for controlling the motion of a pair of fog-lights.

For a better understanding of the present invention and objects thereof, a study of the detailed description of the embodiments described hereinafter should be made in relation to the accompanying drawings.

BRIEF DESCRIPTION OF THE DRAWINGS

FIG. 5 is a diagrammatic view of a circuit controlling the motion of two retractable fog lights in accordance with a preferred embodiment of the present invention.

DETAILED DESCRIPTION OF THE PREFERRED EMBODIMENT

Figure 1:
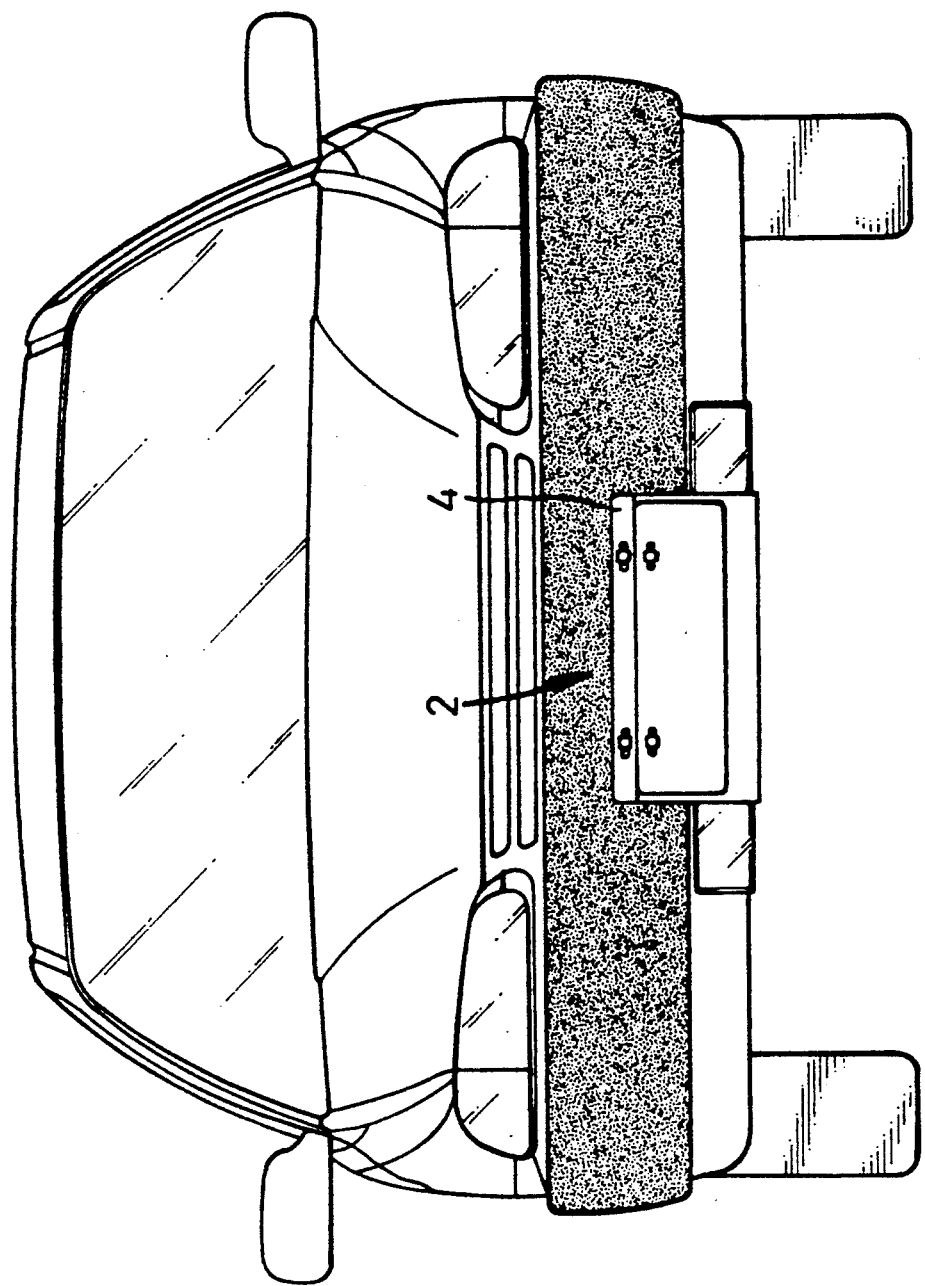
FIG. 1 is a front plane view of a fog-light assembly mounted on a bumper of a car in accordance with a preferred embodiment of the present invention.

Referring to the drawings and, more particularly to FIG. 1, in accordance with a preferred embodiment of the present invention, a fog-light assembly 2 is mounted on a bumper of a car. The fog-light assembly 2 has a plate 4. Two slots 6 extend in an upper margin of the plate 4. Two threaded bolts are inserted through the slots 6 and secured in two threaded holes which are formed when the car is fabricated. Originally, the threaded holes in the bumper are for mounting a number plate for the car. However, the threaded holes in the bumper are employed for mounting the fog-light assembly 2 in accordance with the present invention.

Figure 2:
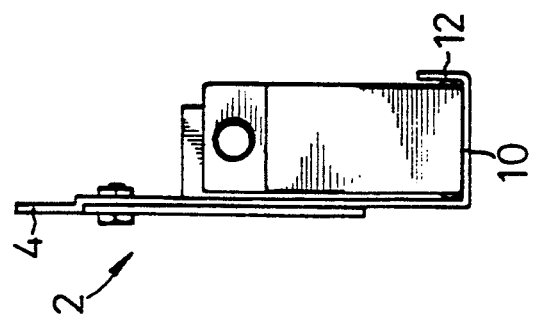
FIG. 2 is a side elevational view of a fog-light assembly in accordance with a preferred embodiment of the present invention.

Referring to FIG. 2, on the front side of the plate 4, an upper flange extends below and parallel to a common axis of the slots 6 and a lower flange extends along the lower edge. The number plate is mounted between the upper and lower flanges. Two slots 8 extend in the plate 4 on a level below the upper flange, corresponding to two slots extending in the number plate on the same level. Two threaded bolts are inserted through the slots 8 and the slots in the number plate and secured in two nuts with threading, for mounting the number plate on the plate 4.

On the rear side of the plate 4, a limb 10 has a first edge extending along the lower edge of the plate 4 at the right angle and a second edge along which a limb 12 extends at the right angle. Thus, the plate 4 and limbs 10 and 12 consist in a track.

Figure 3:
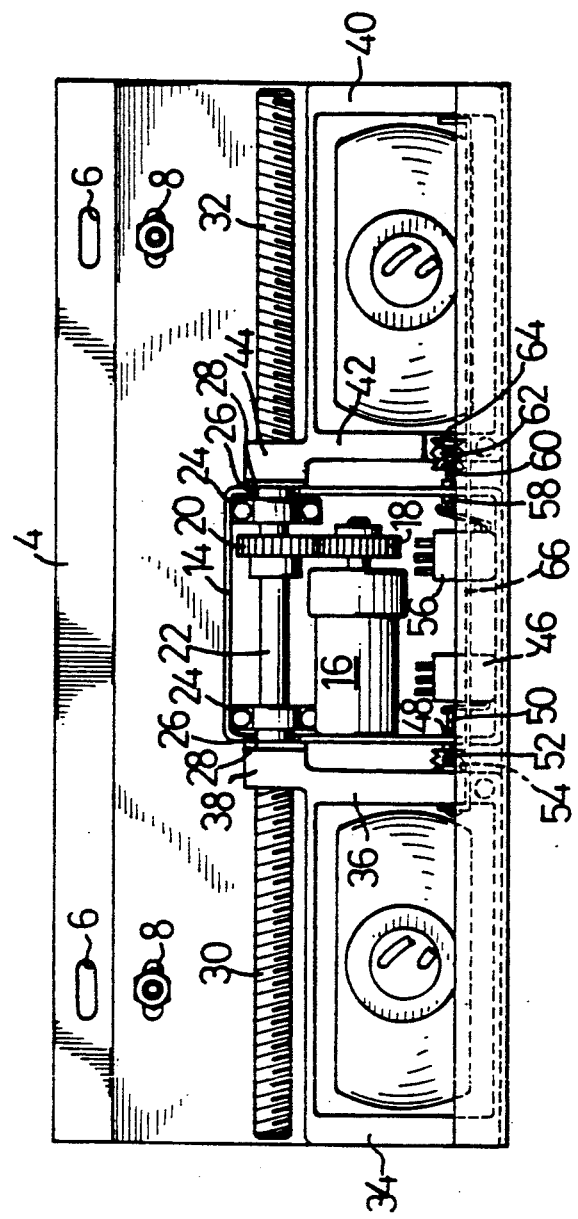
FIG. 3 is a back plane view of a fog-light assembly in accordance with a preferred embodiment of the present invention.

Referring to FIG. 3, a housing 14 is attached on the rear side of the plate 4. A motor 16 is mounted in the housing 14 with its mandrel extending parallel to the track. Co-axially attached to the mandrel of the motor 16 is a gear 18 engaging with a gear 20. A shank 22 co-axially bearing the gear 20 is mounted on two bearings 24 mounted in the housing 14. Two terminal sections of the shank 22 extend through two holes 26 in two lateral walls of the housing 14. Each of two sealing rings 28 is mounted about a corresponding terminal section of the shank 22 so that each ring 28 is against a corresponding lateral wall of the housing 14 for sealing a corresponding hole 26.

A right-hand threading 30 co-axially extends from the first terminal section of the shank 22 and a left-hand threading 32 co-axially extends from the second terminal section of the shank 22.

A casing 34 is mounted on the track for containing a fog light The casing 34 has a first lateral wall 36 and a second lateral wall. The first lateral wall 36 faces a corresponding lateral wall of the housing 14. An extension from the upper portion of the first lateral wall 36 is formed into a nut with a right-hand threading 38 engaging with the right-hand threading 30. Thus, the fog light mounted in the casing 34 is moved away from the housing 14 when the shank 22 is rotated in a first direction by means of the motor 16 and is moved toward the housing 14 when the shank 22 is rotated in a second direction by means of the motor 16. The first lateral wall 36 has two recesses respectively facing the plate 4 and the limb 12, each for receiving a ball made of steel or the like. The balls contact plate 4 and the limb 12 in order to restrain the casing 34 from contacting the plate 4 and the limb 12. Thus, the friction between the track and the casing 34 is reduced. Consequentially, the casing 34 can move relatively smoothly along the track.

A casing 40 is symmetrical to the casing 34. The casing 40 is also mounted on the track for containing a fog light. The casing 40 has a first lateral wall 42 and a second lateral wall. The first lateral wall 42 faces a corresponding lateral wall of the housing 14. An extension from the upper portion of the first lateral wall 42 is formed into a nut with a left-hand threading 44 engaging with the left-hand threading 32. Thus, the fog light mounted in the casing 40 is moved away from the housing 14 when the shank 14 is rotated in the first direction by means of the motor 16 and is moved toward the housing 14 when the shank 22 is rotated in the second direction by means of the motor 16. The first lateral wall 42 defines two recesses respectively facing the plate 4 and the limb 12, each for receiving a ball made of steel or the like. The balls contact the plate 4 and the limb 12 in order to restrain the casing 40 from contacting the plate 4 and the limb 12. Thus, the friction between the track and the casing 40 is reduced. Consequentially, the casing 40 can move relatively smoothly along the track.

Figure 4:
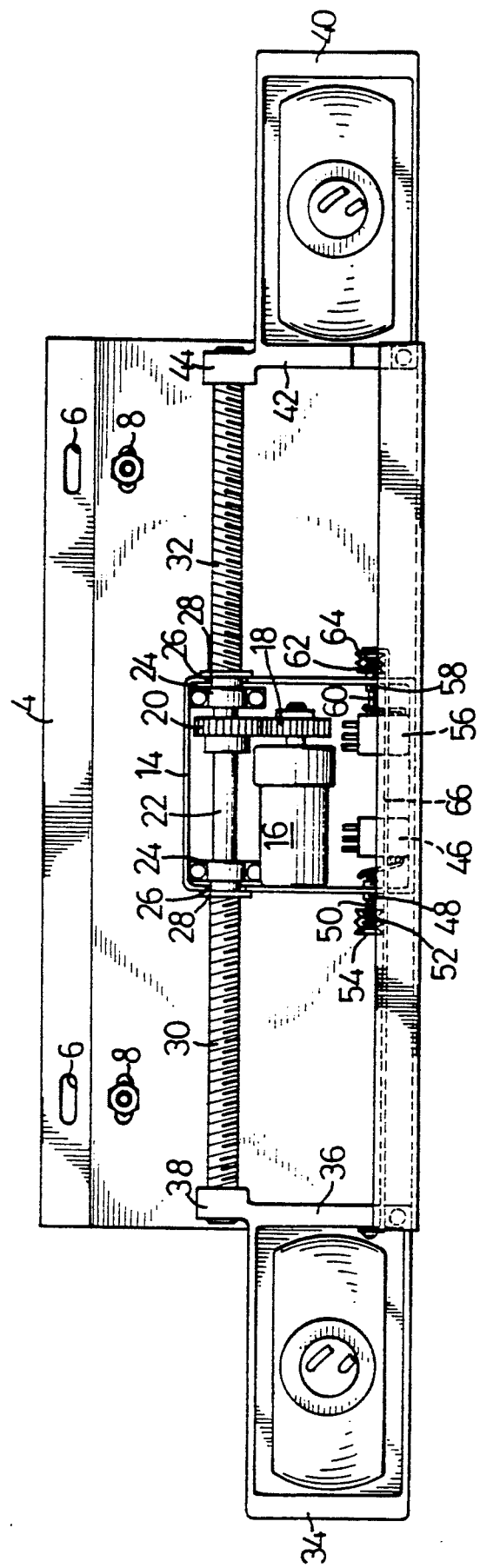
FIG. 4 is a back plane view of a fog-light assembly in accordance with a preferred embodiment of the present invention.

Based on the description given above, it is known that the fog lights respectively mounted in the casings 34 and 40 are switched from an idle position completely behind the plate 4 as shown in FIG. 3 to a working position completely beside the plate 4 as shown in FIG. 4 when the shank 22 is rotated in the first direction by means of the motor 16. The fog lights are moved from a working position completely beside the plate 4 as shown in FIG. 4 to an idle position completely behind the plate 4 as shown in FIG. 3 when the shank 22 is rotated in the second direction by means of the motor 16.

It is preferable that the motor 16 is automatically stopped when the fog lights reach the working position and when the fog lights reach the idle position. Electrical arrangements for such a purpose will be given.

In the housing 14, a micro switch 46 is mounted beside the first lateral wall defining a hole at its lower portion. A collar 48 is securely received in the hole in the first lateral wall of the housing 14. A pin 50 is inserted through a spring 52 and the collar 48. The spring 52 is compressed between a head of the pin 50 and the collar 48. A plastic protective element 54 encloses the spring 52 and a portion of the pin 50. As clearly seen in FIG. 3, the first lateral wall 36 presses the pin 50 in order to actuate the micro switch 46 for turning off the motor 16 when the fog lights are moved to the idle position.

In the housing 14, a micro switch 56 is mounted beside the first lateral wall defining a hole at its lower portion. A collar 58 is securely received in the hole in the first lateral wall of the housing 14. A pin 60 is inserted through a spring 62 and the collar 58. The spring 62 is compressed between a head of the pin 60 and the collar 58. A plastic protective element 64 encloses the spring 62 and a portion of the pin 60. A rod 66 penetrates the first lateral wall 36, the lateral walls of the housing 14 and the first lateral wall 42. The first end of the rod 66 is attached to the first lateral wall 36. As clearly seen in FIG. 4, the second free end of the rod 66 presses the pin 60 in order to actuate the micro switch 56 for turning off the motor 16 when the fog lights are moved to the working position.

Referring to FIG. 5, a circuit connecting a battery, fog lights, micro switches, motor and a switch in the cab of the car is shown. However, it is obvious that those skilled in the art can readily incorporate other circuits by reading this specification.

While the present invention has been explained in relation to its preferred embodiment, it is to be understood that variations thereof will be apparent to those skilled in the art upon reading this specification. Therefore, the present invention is intended to cover all such variations as shall fall within the scope of the appended claims.

I claim:
1. A fog-light assembly comprising:
a plate having an upper margin attached to a front bumper of a car and a lower margin formed with a track on the rear side of the plate;
two fog lights slidably mounted on said track; and
means for moving said pair of fog lights between a working position where the fog lights are beside the plate and an idle position where the fog lights are hidden behind the plate.

* * * * *